May 5, 1959
F. S. VELECKY
2,884,985
PUNCH AND DIE FOR BENDING CHANNEL MEMBER
Filed May 20, 1957
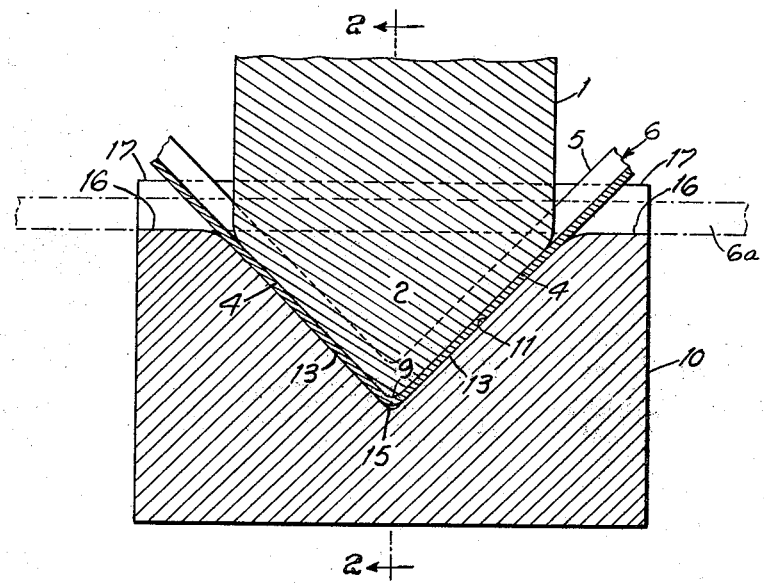
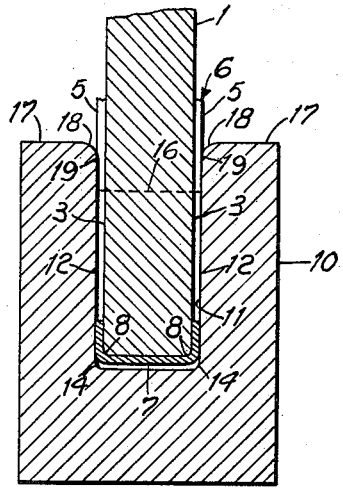
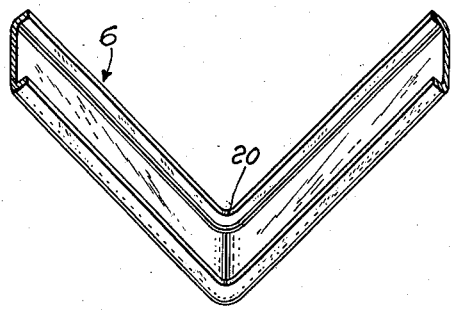
Inventor
FRANK S. VELECKY
By *Percy P. Landy*
Attorney

United States Patent Office 2,884,985
Patented May 5, 1959

2,884,985

PUNCH AND DIE FOR BENDING CHANNEL MEMBER

Frank S. Velecky, Hackensack, N.J., assignor to International Telephone and Telegraph Corporation, Nutley, N.J., a corporation of Maryland Application May 20, 1957, Serial No. 660,196

4 Claims. (Cl. 153—21)

This invention refers to a punch and die assembly and more particularly to a punch and die for making angular bends in a channel member.

The structural angular members made of channels are preferred to ordinary angles because of the greater strength and rigidity they offer. Such members can be made from channels by notching the channel walls at the required place, bending the intermediate wall to the required angle and welding the notched portions to form an integral part of the structural member. This method can be used to make an angular bend with a small radius, but it has the disadvantage of reducing the strength of the channel material because of the notching and the annealing effect of the welding. Another method of forming a channel member with an angular bend is by lowering the channel in a roll bender to the required angle. This, however, can be done if the angle is of comparatively large radius. There is need for a device to form an angular bend of small radius in a channel member in a relatively simple and inexpensive manner.

It is, therefore, an object of this invention to provide a punch and die for making an angular bend with a relatively small radius in a channel member. This method is an improvement over the prior art in that it eliminates the notching and welding operations, and provides an integral channel member with an angular bend wherein the cold working strain hardens the channel.

A feature of this invention is a punch and die for use in a press and adapted to form an angular bend in a channel member, the punch having the desired angular shape and adapted to fit substantially between the side walls of the channel, the die having a recess of the desired angular shape and adapted to receive therein the channel member. The inside walls of the die adjacent the side walls of the channel are curved outwardly of the recess to permit the channel side walls to flow outwardly when the punch begins to force the channel inwardly of the recess and causes the side walls to flow back to substantially their original planar position as the punch forces the channel member deeper into the recess to prevent deformation of the channel member side walls.

The foregoing and other objects and features of this invention and the manner of attaining them will become more apparent and the invention itself will be best understood by reference to the following description of an embodiment of the invention taken in conjunction with the accompanying drawings, wherein:

Fig. 1 is a sectional view of the punch and die and the channel member therebetween;

Fig. 2 is a section along line 2—2 of Fig. 1; and

Fig. 3 is an isometric view of the angularly bent channel member.

Referring to Figs. 1 and 2, there is shown a punch 1 having an end portion 2 with the desired angular shape. End portion 2 consists of two side walls 3 and two lower surfaces 4 and is adapted to fit substantially within the space between two side walls 5 of a channel member 6 adjacent the intermediate wall 7 thereof. The side edges formed by the junction of side walls 5 and surfaces 4 have a curvature 8 which is substantially equal to the inside radius of the channel member 6. The bottom edge formed by the junction of the tapering surfaces 4 has a curvature 9 which is substantially equal to the inside radius of the desired angular bend. A die 10 has a recess 11 adapted to receive therein the channel member 6 and the punch 1. The recess 11 is formed between two side walls 12 and two lower surfaces 13. The junction 14 of the side walls 12 and the lower surfaces 13 is curved to fit substantially the outer radius of the channel member 6. The junction 15 of the two lower surfaces 13 is curved to equal the curvature 9 of the punch 1. The lower surfaces 13 flare off into the horizontal shelf-like surface 16 which supports the straight channel member 6a shown in broken line, in position to receive the descending punch 1. The side walls 12 extend upwardly beyond the surface 16 and curve off into the horizontal top surfaces 17 of the die 10. The curvature 18 connecting surfaces 17 and 12 begins at a point 19 which is approximately two-thirds of the distance between surfaces 17 and 16.

When the straight channel member 6a is in position on the shelf 16, punch 1 descends and begins to force the channel 6a into the die recess 11. If the height of the channel side walls 5 is shorter than or equal to the distance between surface 16 and point 19, the downward progress of the punch 1 will be fast enough to prevent the channel side walls from getting underneath the punch 1 as the channel displacement occurs. In actual practice, it has been found that this maximum height of channel wall 5 is one-quarter inch. If the height of channel wall 5 is greater than one-quarter inch, it is necessary to provide the curvature 18 to allow the wall 5 material to flow outwardly of the die recess 11 when the punch 1 begins to force the channel member 6a inwardly of the recess 11. Then as the punch 1 forces the channel member 6a deeper into the recess 11 and the channel walls 5 begin to contact the straight side walls 12 and are thereby caused to flow back to substantially their original planar positions without deformation, such as cracks, buckling of the channel walls or the like. The curvature 8 of punch 1 and curvature 14 of die 10 are required to conform substantially to the inner and outer radii of channel member 6 to prevent the channel material from flowing into the unwanted space and thus disturbing the smooth channel line around both sides of the angular bend. The curvature 15 of die 10 is made the same as curvature 9 of the punch 1 to provide some extra space for the bottom material of the channel to flow and to prevent the punch 1 from bottoming before conclusion of the punching action.

In actual practice, practically no clearance is provided between the die recess and the outer channel walls. The clearance between the punch surfaces and the inner channel walls has been held to .004" to provide maximum support for the channel walls and prevent buckling and similar distortion. The channel wall material, as has been previously described, tends to flow outwardly and then back again to its original planar position; therefore, the only remaining place left for the wall material at the bend to flow is upward in the space between the punch 1 and the die 2. This flowing accounts for the curvature 20 as shown in Fig. 3. It has been customary when the channel wall height is greater than one-quarter inch, to preform the channel with the walls formed slightly outward to give them a start in flowing when the punch 1 forces the channel down into the recess 10. This punch and die has been used successfully on both ferrous and non-ferrous metals and on aluminum up to one-eighth inch in thickness.

While I have described above the principles of my invention in connection with the specific apparatus, it is to be clearly understood that this description is made only by way of example and not as a limitation to the scope of my invention as set forth in the objects thereof and in the accompanying claims.

I claim:

1. In combination, a punch and die for use in a press and adapted to form an angular bend in a channel member having an intermediate wall and two side walls at right angles thereto, said punch having the desired angular shape and adapted to fit substantially within the space between said side walls, said die having a recess of the desired angular shape and adapted to receive therein said channel member, the inside walls of said die adjacent said side walls of said channel member being curved outwardly of said recess to permit said side walls of said channel member to flow outwardly when said punch begins to force said channel member inwardly of said recess and permit said side walls of said channel member to flow back to substantially their original planar positions as said punch forces said channel member deeper into said recess to prevent deforming said side walls of said channel member.

2. In combination, a punch and die for use in a press and adapted to form an angular bend in a channel member having an intermediate wall and two side walls at right angles thereto, said punch having the desired angular shape and adapted to fit substantially within the space between said side walls, the side edges of said punch having a curvature equal substantially to the inside radius of said channel walls, said die having a recess of the desired angular shape and adapted to receive therein said channel member, the inside walls of said die adjacent said side walls of said channel member being curved outwardly of said recess to permit said side walls of said channel member to flow outwardly when said punch begins to force said channel member inwardly of said recess and cause said side walls of said channel member to flow back to substantially their original planar positions as said punch forces said channel member deeper into said recess to prevent deforming said side walls of said channel member, the inside side edges of said recess having a curvature to conform substantially with the outside radius of said channel walls.

3. In combination, a punch and die for use in a press and adapted to form an angular bend in a channel member having an intermediate wall and two side walls at right angles thereto, said punch having the desired angular shape and adapted to fit substantially within the space between said side walls, the bottom edge of said punch transverse to said side walls having a curvature substantially equal to the inside radius of the desired angular bend, said die having a recess of the desired angular shape adapted to receive therein said channel member, the inside walls of said die adjacent said side walls of said channel member being curved outwardly of said recess to permit said side walls of said channel member to flow outwardly when said punch begins to force said channel member inwardly of said recess and cause said side walls of said channel member to flow back to substantially their original planar positions as said punch forces said channel member deeper into said recess to prevent deforming said side walls of said channel member, and the bottom edge of said recess transverse to said side walls having a curvature substantially equal to the radius of said bottom edge of said punch.

4. In combination, a punch and die for use in a press and adapted to form an angular bend in a channel member having an intermediate wall and two side walls at right angles thereto, said punch having the desired angular shape and adapted to fit substantially within the space between said side walls, the side edges of said punch having a curvature equal substantially to the inside radius of said channel walls, the bottom edge of said punch transverse to said side edges having a curvature substantially equal to the inside radius of the desired angular bend, said die having a recess of the desired angular shape and adapted to receive therein said channel member, the inside walls of said die adjacent said side walls of said channel member being curved outwardly of said recess to permit said side walls of said channel member to flow outwardly when said punch begins to force said channel member inwardly of said recess and cause said side walls of said channel member to flow back to substantially their original planar position as said punch forces said channel member deeper into said recess to prevent deforming said side walls of said channel member, the inside side edges of said recess having a curvature to conform substantially with the outside radius of said channel walls and the bottom edge of said recess transverse to said side edges having a curvature substantially equal to the radius of said bottom edge of said punch.

References Cited in the file of this patent

UNITED STATES PATENTS

| | | |
|---|---|---|
| 858,172 | Godfrey | June 23, 1907 |
| 1,880,479 | Ragsdale | Oct. 4, 1932 |
| 2,023,638 | Lawson | Dec. 10, 1935 |
| 2,119,900 | Bate | June 7, 1938 |
| 2,287,933 | Green | June 30, 1942 |

FOREIGN PATENTS

| | | |
|---|---|---|
| 15,424 | Great Britain | Sept. 11, 1891 |